United States Patent [19]

Yamanouchi et al.

[11] Patent Number: 4,618,417
[45] Date of Patent: Oct. 21, 1986

[54] FUEL FILTER FOR DIESEL ENGINE

[75] Inventors: Katsuto Yamanouchi; Katsuo Saitoh, both of Yokohama; Yoshinori Saito; Tadashi Kikyohara, both of Atsugi, all of Japan

[73] Assignees: Nissan Motor Co., Ltd.; Atsugi Motor Parts Co., Ltd., both of Japan

[21] Appl. No.: 696,912

[22] Filed: Jan. 31, 1985

[30] Foreign Application Priority Data

Feb. 4, 1984 [JP] Japan .................. 59-17659

[51] Int. Cl.⁴ ............................................ B01D 27/10
[52] U.S. Cl. .................................. 210/149; 210/184
[58] Field of Search ............... 210/149, 181, 184, 185, 210/176; 123/557

[56] References Cited

U.S. PATENT DOCUMENTS 3,687,290 8/1972 Myers ................................ 210/149

4,510,060 4/1985 Stewart ................................ 210/149

FOREIGN PATENT DOCUMENTS 55-46093 3/1980 Japan .

Primary Examiner—John Adee
Attorney, Agent, or Firm—Leydig, Voit & Mayer, Ltd.

[57] ABSTRACT

A fuel filter is disposed in a fuel supply line connecting a fuel tank to a fuel injection pump of a diesel engine, and provided with a fuel passage through which a warmed overflown fuel from the fuel injection pump is supplied to the upstream side of a filter element of the fuel filter. A check valve is disposed in the fuel passage of the fuel filter and adapted to be openable to allow the warmed fuel to flow through the fuel passage. Additionally, a bimetal element is disposed to be operatively connectable with the check valve to cause the check valve to open in response to the temperature of the fuel within the fuel filter.

13 Claims, 7 Drawing Figures

FUEL FILTER FOR DIESEL ENGINE

BACKGROUND OF THE INVENTION

1. Field of the Invention

This invention relates to a fuel filter used in a fuel supply system of a diesel engine, and more particularly to the fuel filter provided with a device for preventing clogging of a filter element with wax crystallized in diesel fuel.

2. Description of the Prior Art

In connection with diesel engines operated on diesel fuel or light oil, wax component contained in the diesel fuel tends to crystallize out at temperatures below about −10° C. and adheres to the filter media of a filter element of a fuel filter thereby to clog the filter media. This interrupts the fuel supply to an engine, resulting in engine power output shortage and engine stalling, which will, accordingly, lower the vehicle speed or even cause the vehicle to stop.

To solve such problems, it has been already proposed to recirculate warmed fuel overflowing from a fuel injection pump back to the fuel filter thereby to warm up the fuel within the fuel filter for the purpose of preventing crystallization of wax component in the fuel. The flow amount of the warmed fuel to be fed to the fuel filter is usually controlled by a regulator valve using a thermally responsive expandable member such as a wax pellet. However, certain drawbacks have been encountered in such a fuel supply system utilizing a regulator valve. The calibration and adjustment of the regulator valve are very difficult because of the unreliability of the thermally responsive expandable member. Moreover, failure in the calibration of the valve may cause an excessive expansion of the thermally expandable member, resulting in the breakdown of the regulator valve.

SUMMARY OF THE INVENTION

A fuel filter of the present invention is disposed in a fuel supply line connecting a fuel tank to a fuel injection pump of a diesel engine. The fuel filter is provided with a fuel introduction port to receive a warmed fuel overflowing from the fuel injection pump for supplying to a filter element of the fuel filter. A check valve is disposed in the fuel introduction port of the fuel filter and adapted to be opened to allow the warmed fuel to flow therethrough. Additionally, a bimetal element is disposed within the fuel filter and operatively connectable with the check valve to cause the check valve to open in response to a predetermined temperature thereof. The proportion of the warmed fuel passing through the check valve is controlled and adjusted by a degree of valve opening determined by the temperature of the fuel in the fuel filter.

Accordingly, by virtue of using the bimetal element, the calibration or adjustment of opening and closing values of the check valve is facilitated. Furthermore, the bimetal element can thermally deform in the direction to separate from the check valve at a high temperature range so that there is no obstruction which may cause a breakdown to the bimetal element due to excessive thermal stress.

BRIEF DESCRIPTION OF THE DRAWINGS

The features and advantages of the fuel filter according to the present invention will be more clearly appreciated from the following description taken in conjunction with the accompanying drawings in which same reference numerals designate same elements, and in which.

DETAILED DESCRIPTION OF THE INVENTION

Figure 1:
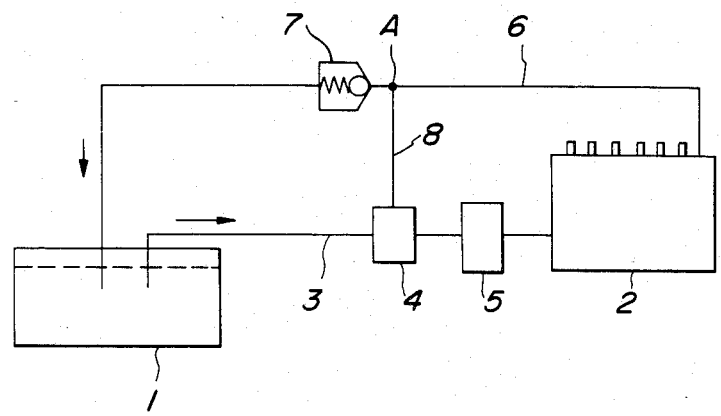
FIG. 1 is a diagrammatic view of a conventional fuel supply system for a diesel engine.
Figure 2:
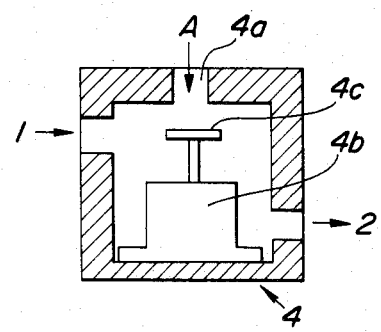
FIG. 2 is a vertical sectional view of a conventional regulator valve used in the system of FIG. 1.

To facilitate understanding of the present invention, a brief reference will be made to a conventional fuel supply system for a diesel engine, depicted in FIGS. 1 and 2. This fuel supply system is, for example, disclosed in Japanese Patent Provisional (First) Publication No. 55-46093. Referring to FIGS. 1 and 2, fuel in a fuel tank 1 is supplied via a fuel supply line 3 to a fuel injection pump 2 from which fuel is fed to fuel injection nozzles (not shown) disposed for individual engine cylinders of the diesel engine so that the individual engine cylinders are supplied with sprayed fuel. A regulator valve 4 and a fuel filter 5 are disposed in the fuel supply line 3 to respectively regulate the amount of supplied fuel and filter it to remove foreign materials in fuel. Fuel overflowing from the fuel injection pump 2 returns through a check valve 7 to the fuel tank 1 via a fuel return line 6. The overflowing fuel is warmed upon receiving mechanical work of the fuel injection pump 2, and a part thereof is introduced into a port 4a of the regulator valve 4 via a warmed fuel supply line 8 which is branched off from the fuel return line 6 at a portion A. The regulator valve 4 is provided therein with a thermally responsive expandable member 4b such as a thermo-wax pellet to which a valve member 4c is connected. The valve member 4c is located facing the port 4a and adapted to open and close the port 4a, so that the port 4a is closed when the temperature of fuel flowing through the inside of the regulator valve 4 sensed by the thermally responsive expandable member 4b is above a predetermined level.

Accordingly, when the engine has not yet warmed-up and the temperature of fuel passing through the regulator valve 4 from the fuel tank 1 is low, the port 4a of the regulator valve 4 is opened so that the warmed overflowing fuel is introduced into the fuel from the injection pump 2 supply line 3 for mixing. This mixing of warmed and normal fuel from the tank raises the temperature of the overall fuel to be passed through the filter, thereby preventing wax component in the fuel from solidification. Therefore, the fuel can be smoothly passed through the filter media of the fuel filter, preventing the fuel filter from clogging.

However, the following drawbacks have been encountered in the fuel supply system provided with the fuel filter and regulator valve of the above-mentioned type. That is to say, since the valve opening degree of the regulator valve 4 is controlled by the thermally responsive expandable member 4b such as wax a pellet or the like, a wide range of dispersion of initial setting position of the valve member 4c is unavoidably made among respective manufactured bodies of the regulator valves, thereby providing difficulty in adjusting the regulator valves. Furthermore, if the expansion of the thermally responsive expandable member 4b still continues even when the valve member 4c has been seated in position to make closure of the regulator valve, an excess stress is applied to the valve member 4c and the thermally responsive expandable member 4b, which may lead to the breakdown thereof. To prevent this, it is necessary to make such a precise adjustment of the valve member 4c so that the valve member 4c at its maximum lift position is just brought into being seated onto the port 4a. It is to be noted that such a precise adjustment is very difficult to make. In this regard, there are cases in which the adjustment has been unavoidably made such that the complete closure of the regulator valve does not occur from a point of view of preventing the breakdown of the regulator valve.

In view of the above description of the conventional fuel supply system provided with the fuel filter, reference is now made to FIGS. 3 to 7, wherein a fuel supply system for a diesel engine is illustrated to be provided with a fuel filter 13 of the present invention. The fuel supply system comprises a fuel tank or reservoir 11. Fuel in the fuel tank 11 is fed through a fuel supply line 12 to a fuel filter 13 of the present invention to be filtered thereby to remove foreign materials. Thereafter the filtered fuel is sucked into a fuel injection pump 14 such as of a distributor type. The fuel injection pump 14 is provided therein with a feed pump and a pressure regulator (not shown) in which the filtered fuel sucked by the feed pump is maintained at a suitable pressure under the action of the pressure regulator and then fed to a pump section (not shown) while accomplishing lubrication and cooling of a variety of moving parts.

The filter fuel fed to the pump section of the fuel injection pump 14 is then introduced into fuel injection nozzles 15 disposed for respective engine cylinders (not shown) of the diesel engine, so that each fuel injection nozzle 15 is adapted to inject the fuel into the corresponding engine cylinder. The excess fuel not injected from the fuel injection nozzles 15 and the fuel within the fuel injection pump 14 return to the fuel tank 11 respectively via return lines 16, 17 which are connected through a return line 18 to the fuel tank 11. It will be understood that such fuel overflowing from the fuel injection pump 14 is warmed or heated upon receiving mechanical work of the fuel injection pump 14 so that the temperature of the fuel is slightly raised. Heat of the thus warmed fuel is usually released in the fuel tank 11.

A gas-liquid separator 19 having check valve function is disposed in the return line 18. The gas-liquid separator 19 includes a casing 19a defining therein a float chamber 21. The casing 19a is provided with an inlet pipe 19b connected to the return lines 16, 17 on the side of the fuel injection pump 14, and an outlet pipe 19c connected to the return line 18 on the side of the fuel tank 11. A check valve 22 is disposed in the outlet pipe 19c to regulate the fuel flowing through the outlet pipe 19c. The fuel introduced through the inlet pipe 19b into the float chamber 21 is subjected to gas-liquid separation due to the difference in specific gravity, so that only the fuel accompanying gas bubbles opens the check valve 22 and flows to the fuel tank 11. A float 23 is floatingly disposed in the float chamber 21 and functions to close an outlet port 24 located at the bottom wall of the casing 19a when the level of the overflowing fuel in the float chamber 21 lowers below a predetermined level in which the float 23 descends along with the level of the fuel. Only the fuel not mixed with gas is fed out through the outlet port 24. The outlet port 24 of the gas-liquid separator 19 is communicated via a warmed fuel supply line 25 to an introduction port 13a of the fuel filter 13.

Figure 5:
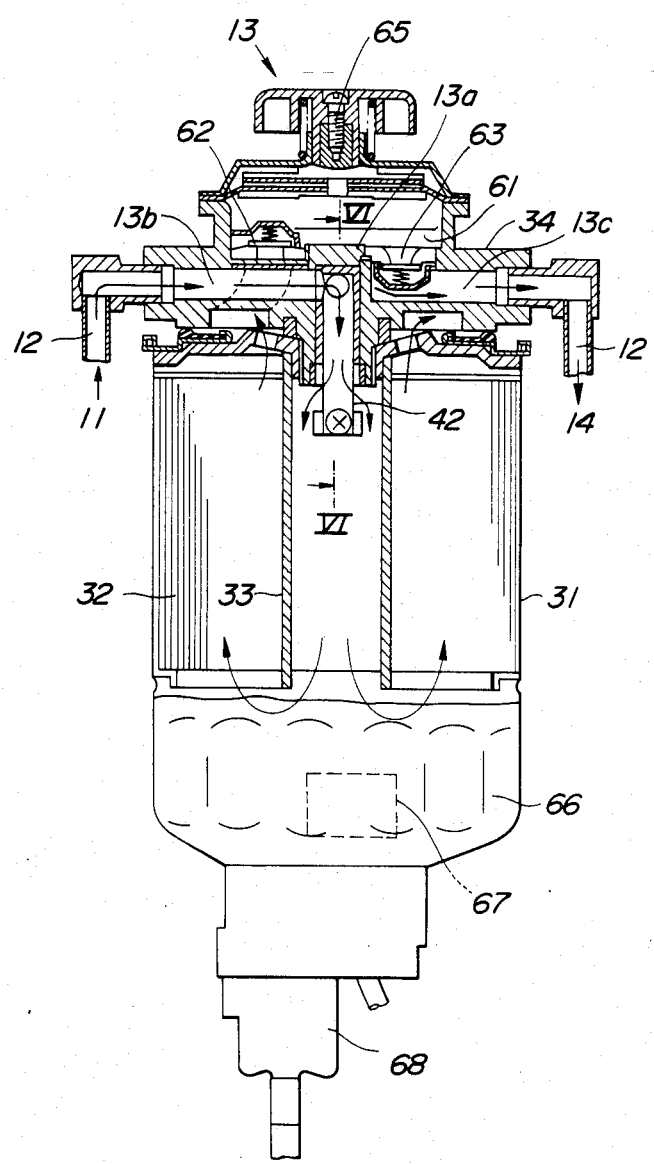
FIG. 5 is an enlarged sectional view of the fuel filter used in the system of FIG. 3.
Figure 6:
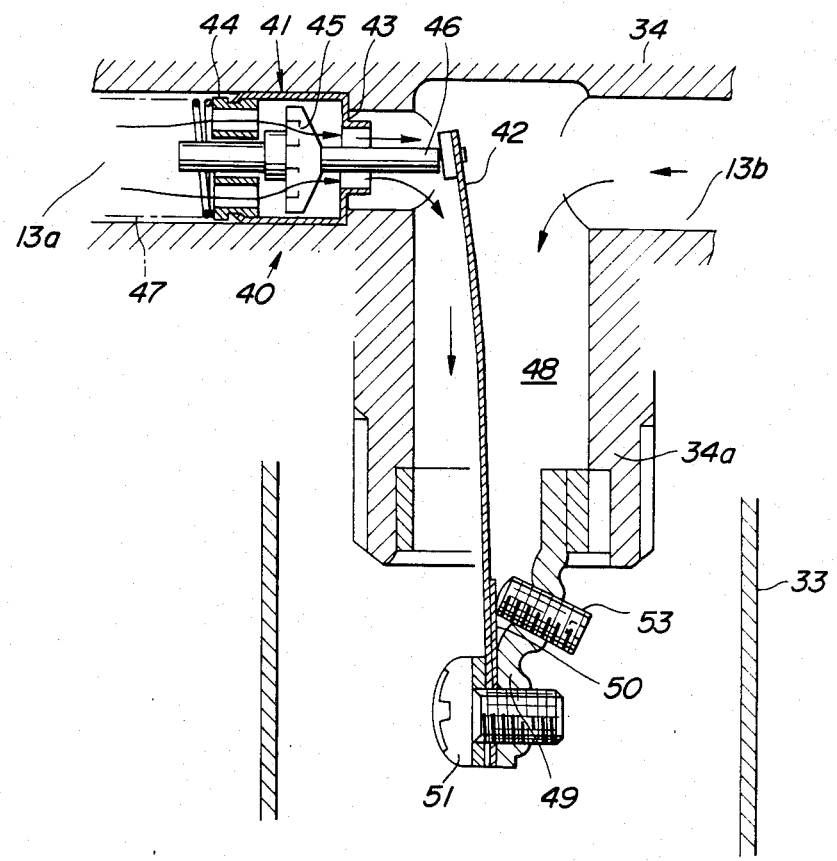
FIG. 6 is an enlarged fragmentary sectional view taken in the direction of arrows substantially along the lines VI—VI of FIG. 5, showing an operational mode of a thermally responsive valve device used in the fuel filter according to the present invention.

As shown in FIGS. 5 and 6, the fuel filter 13 includes a cylindrical filter element 32 which is disposed at the central section of a filter body 31 and located coaxially with a center tube 33. An upper cover 34 is securely connected to the upper end of the filter body 31, and formed with an inlet port 13b communicated with the fuel supply line 12 on the side of the fuel tank 11 and an outlet port 13c communicated with the fuel supply line 12 on the side of the fuel injection pump 14. The above-mentioned introduction port 13a for the warmed overflowing fuel is in communcation with the bore of the center tube 33. The inlet port 13b is in communication with the bore of the center tube 33, while the outlet port 13c is in communication with the downstream side of the filter element 32. Accordingly, the fuel from the fuel tank 11 is fed through the inlet port 13b into the center tube 33 and then flows from the bottom end of the center tube 33 through the filter media of the filter element 32 to be filtered. Thereafter, the fuel is introduced through the outlet port 13c to the fuel injection pump 14. The warmed overflowing fuel is fed via the warmed fuel supply line 25 to the upstream side of the filter element 32.

The introduction port 13a for the warmed overflowing fuel forms part of the warmed fuel supply line 25. A thermally responsive valve device 40 includes a check valve 41 disposed in the introduction port 13a formed in the upper cover 34 as shown in FIG. 6. The check valve 41 includes a valve member 45 which is floatingly movably disposed between a valve seat 43 and a stopper 44 which are integrally connected to and spaced from each other in the direction of flow of the warmed fuel. The valve member 45 is provided with a rod 46 projected therefrom toward a bimetal element 42 through a valve opening (no numeral) formed at the valve seat 43, the tip end of the rod 46 being located downstream of the valve seat 43. An integral unit of the valve seat 43 and the stopper 44 is biased to the inner wall of a narrowed section of the introduction port 13a by a spring 47, thus securely locating the unit in position. This locating is made when the warmed fuel supply pipe 25 is connected through a connector (not shown) to the introduction port 13a, in which the spring 47 is set in position upon being compressed, applying the reaction force of the spring 47 to the integral unit.

The elongate bimetal element 42 is disposed in an axial passage 48 which is formed in a vertically projected boss section 34a of the upper cover 34 so as to establish communication of the inlet port 13b and the introduction port 13a with the bore of the center tube 33. The bimetal element 42 extends generally along the axis of the axial passage 48 and has an upper free end contactable with the tip end of the rod 46 of the check valve 41. A lower end of the bimetal element 42 is fixed to a stay 49 together with a backing plate 50 by means of a small screw 51. The stay 49 is fitted in the bottom end of the boss section 34a and fixed in position by way of caulking. The upper end of the bimetal element 42 is movable toward and away from the rod 46 of the check valve 41 in response to the temperature of the fuel in contact with the bimetal element 42.

Figure 8:
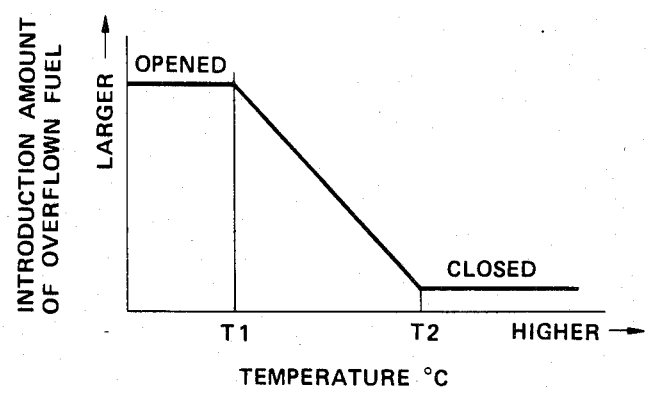
FIG. 8 is a graph showing the characteristics of the thermally responsive valve device.
Figure 3:
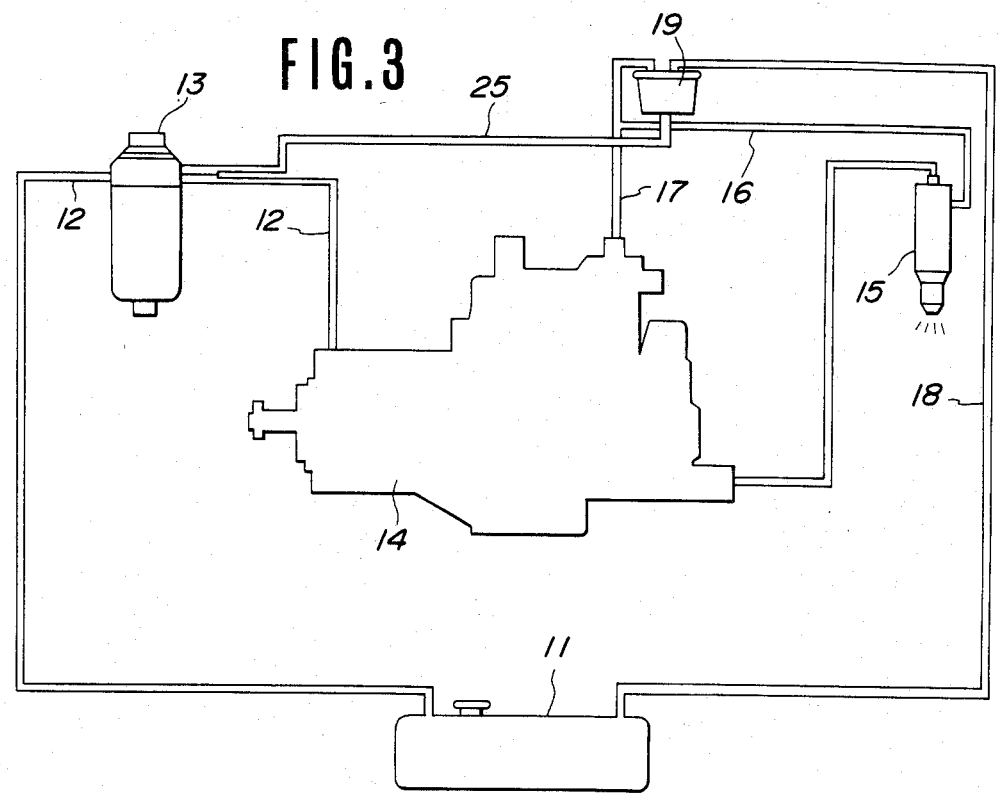
FIG. 3 is a schematic illustration of a fuel supply system for a diesel engine, provided with a fuel filter according to the present invention.
Figure 4:
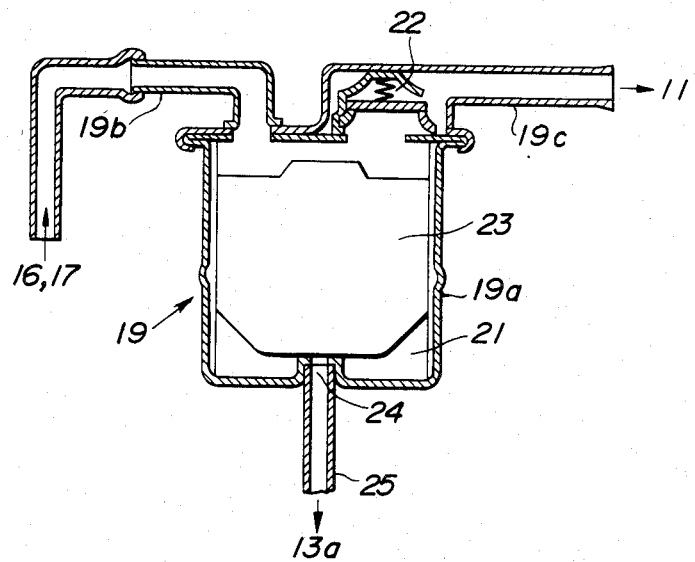
FIG. 4 is an enlarged sectional view of a gas-liquid separator with a check valve, used in the system of FIG. 3.
Figure 7:
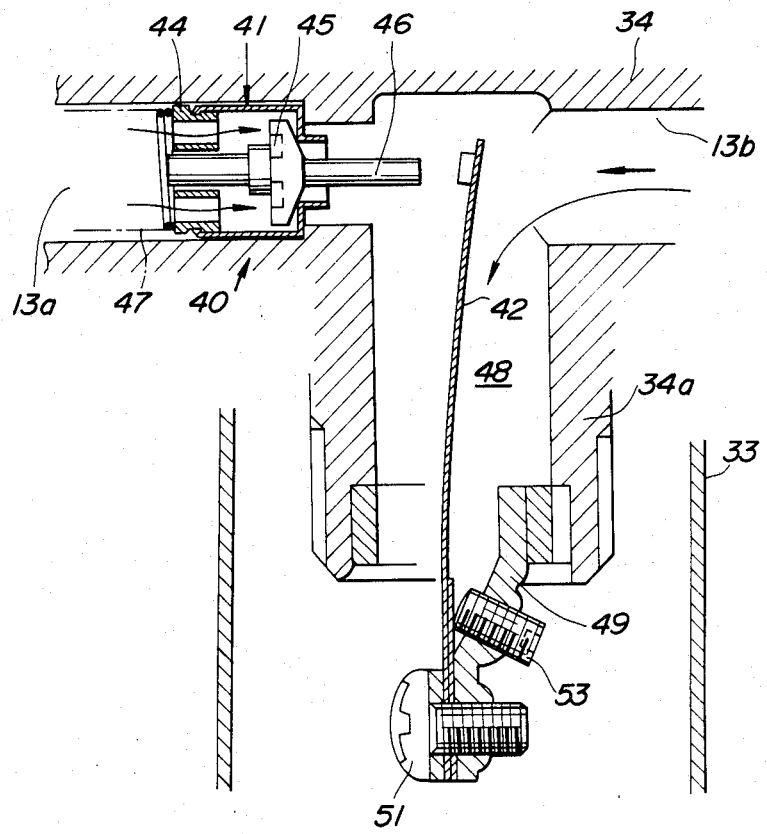
FIG. 7 is an enlarged fragmentary sectional view similar to FIG. 6, but showing another operational mode of the thermally responsive valve device.

More specifically, the bimetal element 42 is adapted to be thermally deformable in response to the temperature of mixed fuel flow of the relatively low temperature fuel from the fuel tank 11 and the relatively high temperature overflowing fuel introduced through the warmed fuel supply line 25, passing through the axial passage 48. Accordingly, when the temperature of the mixed fuel flow is relatively low, the bimetal element 42 pushes at its upper end the rod 46 of the check valve 41 leftward in the drawing thereby to variably control the flow passage area by the valve seat 43 and valve member 45. In this case, there is a relationship as shown in FIG. 8 between the temperature of the mixed fuel flow and the introduction amount (into the fuel filter 13) of the overflown fuel to be supplied through the warmed fuel supply line 25. Consequently, when the temperature of the mixed fuel flow is below a first predetermined level T1 (for example, about 0° C.), the check valve 41 is fully opened. When the temperature of the mixed fuel flow is above a second predetermined level T2 (for example, within a range of 30° to 40° C.), the bimetal element 42 separates from the rod 46 of the check valve 41, so that the check valve 41 is fully closed under the influence of the flow of the overflown fuel fed to the introduction port 13a as shown in FIG. 7. A further thermal deformation (rightward in the drawing) of the bimetal element 42 is made as the temperature of the mixed fuel flow rises over the second predetermined level T2. It is to be noted that this thermal deformation is free with no obstruction.

As shown, the backing plate 50 is disposed in contact with the bimetal element 42 at the surface opposite to the check valve 41. Additionally, an adjustment screw 53 is screwed in the stay 49 to be moved forward and backward. The tip end of the adjustment screw is in press contact with the backing plate 50 at the surface opposite to the bimetal element 42. Accordingly, upon rotation of the adjustment screw 53, the setting position of the backing plate 50 is adjusted to make the positioning of the bimetal element 42, thereby accomplishing the initial positioning of the bimetal element 42. This effectively removes the dispersion of the characteristics of respective manufactured bodies of bimetal element 42. Furthermore, since the adjustment screw 53 does not directly contact with the bimetal element 42, the bimetal element 42 is avoided from stress concentration, thereby effectively maintaining its thermal deformation characteristics.

As shown in FIG. 5, the upper cover 34 is formed with a fuel passage 61 which is located between the filter element 32 and the outlet port 13c, so that the fuel filtered by the filter element 32 flows through the passage 61 to the outlet port 13c. The reference numeral 65 denotes a manually operated pump for the purpose of venting air, which is adapted to pressurize the fuel in the passage 61 to flow through check valves 62, 63, thus filling the fuel in the fuel supply line 12. The fuel filter 13 is provided with a water separator 66 which is adapted to separate water from the fuel under the difference in specific gravity, the thus separated water being accumulated therein. A water level sensor 67 is disposed in the water separator 66 to detect the level of water accumulated in the water separator 66 thereby to produce warning. A drain cock 68 is provided to drain water accumulated in the water separator 66.

The manner of operation of the thus configured fuel filter 13 will be discussed hereinafter.

The fuel sucked up from the fuel tank 11 is filtered by the filter media of the filter element 32 of the fuel filter 13, and then introduced via the fuel supply line 12 to the fuel injection pump 14. When the temperature of the fuel is below the first predetermined level T1, the wax component of the fuel is crystallized thereby to cause a tendency of clogging the filter media of the filter element 32. However, in this case, the bimetal element 42 is thermally deformed to move leftward as shown in FIG. 6, thereby causing the check valve 41 to fully open as illustrated in FIG. 8. Consequently, the relatively high temperature fuel overflowing from the fuel injection pump 14 is fed via the warmed fuel supply line 25 to the introduction port 13a of the fuel filter 13, and then introduced into the center tube 33 thereby to raise the temperature of the fuel to be passed through the filter media of the filter element 32. This avoids the crystallization of the wax component in the fuel, thereby preventing the filter media of the filter element 32 from clogging. Therefore, the fuel injection pump 14 can be smoothly supplied with fuel, so that the engine is effectively prevented from power output lowering and engine stall.

As illustrated in FIG. 8, in this case, the amount of the overflown fuel to be introduced into the fuel filter 13 is gradually decreased as the temperature of the fuel within the fuel filter 13 increases over the first predetermined temperature level T1 toward the second predetermined temperature level T2. As the fuel temperature level rises, the bimetal element 42 gradually thermally deforms to move rightward in FIG. 7 in response to the rising fuel temperature, and accordingly the valve member 45 moves rightward under the action of dynamical pressure of the overflowing fuel thereby to decrease the flow passage area of the check valve 41. As a result, the introduction amount of the overflown fuel is gradually reduced, thus controlling the fuel temperature of the fuel within a range between the first and second predetermined temperature levels T1, T2.

Now, in the event that the fuel temperature rises over the second predetermined temperature level T2, baneful influence is exerted on fuel-lubrication for the various moving parts of the fuel injection pump 14 while reducing the fuel injection amount (in weight) thereby to invite engine power output lowering. Accordingly, no recirculation of the warmed overflown fuel again back to the fuel injection pump 14 is required so that all the amount of the overflown fuel return to the fuel tank 11 to be cooled.

In this regard, with the fuel filter 13 of this case, when the fuel temperature rises over the second predetermined temperature level T2, the bimetal element 42 is further thermally deformed to separate from the valve member 45 of the check valve 41 thereby to fully close the check valve 41. This interrupts the flow of the overflown fuel fed through the warmed fuel supply line 25 to the fuel filter 13, thus meeting the above-mentioned requirement. Since there is no obstruction to prevent the thermal deformation of the tip end section of the bimetal element 42 even upon the fuel temperature exceeding the second predetermined temperature level T2, the bimetal element 42 is prevented from receiving an excessively high thermal stress, thus avoiding the breakdown of whole the thermally responsive valve device 40.

It will be suspected that the following problems will arise when the filter media of the filter element 32 is unexpectedly clogged: reverse flow of the fuel is made so that the fuel on the side of the fuel tank 11 is introduced through the warmed fuel supply line 25 into the fuel filter 13; and the pressure prevailing downstream of the filter element 32 lowers, so that gas bubbles are produced in the fuel and then the fuel with the gas bubbles are overflown from the fuel injection pump 14, and again fed to the fuel injection pump 14 via the warmed fuel supply line 25 and the fuel filter 13. However, with the fuel supply system shown in FIG. 3, the check valve 22 of the gas-liquid separator 19 shown in FIG. 4 prevents the reverse flow of the fuel back to the fuel filter 13, thereby avoiding the problem that the check valve 41 of the fuel filter 13 makes its failed operation due to the fact that foreign material in the fuel tank 11 is introduced into the check valve 41. Additionally, the gas bubbles in the fuel overflown from the fuel injection pump 14 can be effectively separated in the gas-liquid separator 19, so that the overflowing fuel with the gas bubbles is released to the fuel tank 11 while only the overflowing fuel with no gas bubble is fed from the outlet port 24 of the gas-liquid separator 19 to the fuel injection pump 14 via the fuel filter 13.

It will be appreciated that no force due to a spring acts on the valve member 45 of the check valve 41 of the fuel filter 13, a smaller biasing force is sufficient for the bimetal 41, thereby making the bimetal element small-sized.

While the bimetal element 42 has been shown and described as being responsive to the temperature of fuel, it will be understood that the bimetal element 42 may be adapted to be responsive to ambient temperatures (such as the temperature of ambient or atmospheric air) having a relationship to the fuel temperature.

What is claimed is:

1. A fuel filter for use in a diesel engine having a fuel injection pump, said fuel filter comprising;
    a fuel filter body having a center tube, an inlet port to receive fuel from a fuel tank and connected to supply such fuel to said center tube, and an outlet port to supply filtered fuel to said fuel injection pump;
    a filter element located coaxially of said center tube through which fuel received from said center tube is filtered before being supplied through said outlet port to the fuel injection pump;
    means on said filter body defining a fuel introduction port to receive a part of warmed fuel overflowing from the fuel injection pump and connected to supply said warmed fuel to said center tube to be mixed with fuel supplied from said tank;
    a check valve disposed in said fuel introduction port and operable to allow said warmed fuel to flow therethrough; and
    a bimetal element operatively connected to said check valve and mounted on said filter body to sense temperature of fuel flowing through the center tube to cause said check valve to open in response to a predetermined temperature thereof and adjust the proportion of the warmed fuel supplied to the center tube for filtering by the filter element.

2. A fuel filter as claimed in claim 1 wherein said check valve has a valve member which is movable in a first direction to allow said check valve to open, and in a second direction to allow said check valve to close.

3. A fuel filter as claimed in claim 2 wherein said bimetal element has a first end contactable with said valve member so as to urge said valve member in said first direction and a second end secured to a stationary member disposed in said filter body.

4. A fuel filter as claimed in claim 3 wherein said bimetal element first end is movable in a third direction to urge said valve member in said first direction within a first temperature range, and in a fourth direction to separate from said valve member within a second temperature range lower than said first temperature range.

5. A fuel filter as claimed in claim 4 further comprising means for adjusting location of said bimetal element.

6. A fuel filter as claimed in claim 5 wherein said adjusting means is constructed and arranged such that said bimetal element first end is brought into contact with said valve member to allow said check valve to start opening when said fuel temperature reaches a first predetermined level, and continues to urge said valve member to allow said check valve to fully open when said temperature exceeds a second predetermined level higher than said first predetermined level.

7. A fuel filter as claimed in claim 5 wherein said adjusting means includes a backing plate disposed in contact with said bimetal element and secured together with said bimetal element to said stationary member, and an adjustment screw contactable with said backing plate and movably supported by said stationary member.

8. A fuel filter as claimed in claim 7 wherein said bimetal element is disposed in said fuel filter body and said bimetal element first end is sensitive to temperature of the fuel supplied to the center tube of said filter body.

9. A fuel filter as claimed in claim 3 wherein said check valve is urged in said second direction only by the pressure of the fuel flowing through said fuel introduction port.

10. A fuel filter as claimed in claim 1 further comprising a vertical fuel passage in which said inlet port and said fuel introduction port merge, a part of said vertical fuel passage being located inside the center tube of said filter body.

11. A fuel filter as claimed in claim 10 wherein at least a part of said bimetal element is located in said vertical fuel passage.

12. A fuel filter as claimed in claim 3 wherein said valve member of said check valve has a rod extending towards said bimetal element and contactable with said bimetal element first end.

13. A fuel supply system for a diesel engine comprising:
    a fuel injection pump;
    a fuel filter including a filter element through which fuel is filtered before being supplied to said fuel injection pump, means defining a fuel introduction port to receive a part of warmed fuel overflowing from said fuel injection pump and connected to supply said warmed fuel to said filter element, a check valve disposed in said fuel introduction port and operable to allow said warm fuel to flow therethrough, and a bimetal element operatively connected to said check valve to sense temperature of fuel flowing to the filter element to cause said check valve to open in response to a predetermined temperature thereof; and means for separating gas from the fuel and for preventing reverse flow of fuel on the side of a fuel tank to said fuel filter, said means including a casing defining therein a float chamber and having a first port communicated with said fuel introduction port of said fuel filter, a second port communicated with said fuel injection pump, and a third port communicated with said fuel tank, said first port being located at a first level in said casing, said second and third ports being located at a second level higher than said first level, said means further having a float disposed in said float chamber and located between said first and second levels with said first port being closable with said float.

* * * * *